United States Patent [19]
Wycech

[11] Patent Number: 4,901,500
[45] Date of Patent: Feb. 20, 1990

[54] LIGHTWEIGHT COMPOSITE BEAM

[75] Inventor: Joseph Wycech, Grosse Pointe Woods, Mich.

[73] Assignee: Essex Composite Systems, Grosse Pointe Woods, Mich.

[21] Appl. No.: 283,344

[22] Filed: Dec. 12, 1988

Related U.S. Application Data

[62] Division of Ser. No. 98,159, Sep. 18, 1987, Pat. No. 4,861,097.

[51] Int. Cl.⁴ .............................................. E04C 2/08
[52] U.S. Cl. ....................................... 52/793; 52/810; 296/146; 296/189
[58] Field of Search ................... 52/309.8, 309.9, 810, 52/799, 793, 805; 49/502, 374; 296/146, 188, 189; 280/784

[56] References Cited

U.S. PATENT DOCUMENTS 3,211,491 10/1965 Browne et al. .................... 296/189
3,700,076 10/1972 Forsting et al. ................ 296/146 X
3,829,149 8/1974 Stevens ............................. 296/189
3,868,141 2/1975 Johnson ............................ 296/189
3,938,288 2/1976 Roubinet ......................... 52/793 X Primary Examiner—Richard E. Chilcot, Jr.
Attorney, Agent, or Firm—Dykema Gossett

[57] ABSTRACT

A lightweight, composite beam for reinforcing a vehicle door is provided. The reinforcing beam comprises an open channel-shaped metal member having a longitudinal cavity which is filled with a reinforcing polymeric material which in one aspect is a thermoset or thermoplastic resin-based material. The composite beam includes end pieces which are adapted to be mounted to a vehicle door panel in a door cavity by spot-welds or the like. The horizontally mounted beam provides substantially increased resistance to side impacts to the vehicle door in the event of a collision. In one embodiment, the beam is mounted between the window glass space and the inner door panel for flush-glass vehicle doors. In another configuration, one surface of the beam is sculptured to mate with a concise outer door panel.

7 Claims, 3 Drawing Sheets

LIGHTWEIGHT COMPOSITE BEAM

This is a division of co-pending application Ser. No. 098,159, filed on Sept. 18, 1987, now U.S. Pat. No. 4,861,097.

FIELD OF THE INVENTION

The present invention relates generally to motor vehicle doors and to reinforcing beams. More specifically, the present invention relates to impact or intrusion beams which are mounted in vehicle doors to provide increased side-impact resistance.

BACKGROUND OF THE INVENTION

Most motor vehicle doors generally have an outer door panel or skin and an inner door panel in spaced relation such that a door cavity is defined. Disposed within the door cavity are various door systems such as locking mechanisms and lowerable window actuating means. Without further structural reinforcement, these hollow motor vehicle doors are not particularly resistant to permanent deformation by side impacts. That is, when a motor vehicle door of this type is struck during a collision or the like the inner and outer door panels offer only limited resistance to side intrusion. Hence, it will be appreciated that there is a need for structurally reinforced motor vehicle doors to provide greater impact resistance.

Several impact or intrusion-resistant devices and reinforced vehicle doors have been proposed by others such as that disclosed in U.S. Pat. No. 3,868,796 wherein it is suggested that a large foam-filled corrugated panel welded to the outer door skin provides increased impact resistance to a vehicle door. Similarly, in U.S. Pat. No. 3,964,208 a vehicle door proposed which has an inner door panel that crosses the plane of the lowerable window and abuts the outer door panel. The inner door panel has an aperture through which the window passes as it is lowered. In one configuration, the region of the inner panel which abuts the outer panel is corrugated such that voids are defined which may be filled with a foamed material. In U.S. Pat. No. 4,090,734, an undulated impact beam made of steel is disclosed upon which metal plates may be mounted to form a hollow structure. However, these devices suffer from a number of drawbacks ranging from high mass characteristics to complex manufacturing processes. Moreover, other known reinforcing means such as transverse hollow tubes and the like have proven inadequate due to their expense, excessive weight, multiple-piece construction and their inability to be adapted to various door configurations.

Those skilled in the art will understand that side-impact resistance of motor vehicle doors is subject to federal certification. For federal certification, side intrusion of vehicle doors is usually measured using an hydraulic ram which is pressed into the outer door panel. The load required to penetrate the door a preselected depth or distance such as 6 inches, 12 inches or like is determined and the results are compared to the federal standards. In order to comply with these federal standards, a vehicle door must demonstrate a certain minimum degree of side-intrusion resistance.

Although large, heavy, structural reinforcements provide increased side-intrusion resistance, they also add to the total vehicle weight and usually increase material production costs. Therefore, it would be desirable to provide a lightweight, compact door beam designed to easily fit within a vehicle door cavity. By providing a strong yet lightweight door beam, total mass savings could be achieved. In addition, it would also be desirable to provide such a door beam which can be easily fabricated from a minimum number of parts. Ideally, such a beam would be adaptable to various door designs and could be easily altered to provide a range of strengths. The present invention provides such an impact or intrusion door beam having the aforementioned desirable characteristics and features.

SUMMARY OF THE INVENTION

In accordance with the present invention, a lightweight, compact, composite door beam is provided which can be easily mounted in the cavity of a hollow motor vehicle door of the type having an outer panel or skin and an inner panel. The door beam structurally reinforces a vehicle door to provide greater impact resistance to side impacts which may be sustained in a collision.

The novel door beam includes a metal body having a longitudinal axis with first and second wall portions extending in the direction of the longitudinal axis. The body includes an integral U-shaped portion such that the body takes on a generally channel-shaped configuration or structure with spaced opposed walls. The body thus defines a channel-shaped area which extends in the direction of the longitudinal axis. The channel-shaped area is open at the wall edges opposite the U-shaped portion. In this manner, the body of the beam resembles a trough or the like, and the beam is in essence a channel-shaped member. A core or filler member composed of a reinforcing filler material is disposed within the channel-shaped area defined by the body. The core at least partially fills the channel-shaped area. The reinforcing material from which the core is comprised is a synthetic resin-based material. Hence, the door beam is a composite structure. Preferably, the core is formed of a syntactic foam. The core material is rigidly held within the channel-shaped area and is preferably bonded to the walls and U-shaped portion of the body which substantially reinforces the beam. At each end of the beam body, a mounting means is attached by which the beam can be mounted inside a door cavity to at least one door panel. Preferably, the mounting means comprise integral end pieces or end tabs having a shape corresponding to mating surfaces on the door panel to which the beam is secured.

The present invention also provides a reinforced vehicle door. The automotive door has an outer panel or skin and an inner panel which define a door cavity that encloses various door hardware and the window lowering actuator means. The vehicle door is substantially reinforced against side intrusion with the novel door beam of the present invention, which is mounted horizontally inside the vehicle door. In one embodiment, the end pieces or tabs of the beam are secured to the inner door panel by spot welds or the like. Also, in one aspect, the beam is configured and mounted such that the vehicle door window passes between the beam body and the outer door panel when the window is lowered into the door cavity.

In still another aspect, the present invention provides a method for fabricating the novel door beam of the present invention. In substance, a patterned metal piece is formed from a sheet metal blank, the length of the piece being greater than its width. By bending a center section of the patterned metal piece, the U-shaped body portion of the impact beam is formed which includes two walls and U-shaped portion integral and co-extensive with the walls. In one embodiment, this is accomplished by bending the patterned metal piece over a suitable die. The ends of the walls are preferably spot-welded together to close the ends of the trough or groove defined by the walls and U-shaped portion of the beam body. The core is formed either as a discrete part which is then inserted into the trough, or a liquid or paste reinforcing filler material is injected into the trough and then hardened or cured. In both instances, the core is rigidly bonded to the body. The core substantially increases the bend strength and energy absorption of the body of the beam. In one embodiment, the end means or pieces are integral with one wall of the body of the beam and are formed by stamping or the like.

Thus, the present invention provides a lightweight, compact door beam, a vehicle door which is reinforced with this novel door beam, and a method for manufacturing the beam.

DESCRIPTION OF THE PREFERRED EMBODIMENTS

Figure 1:
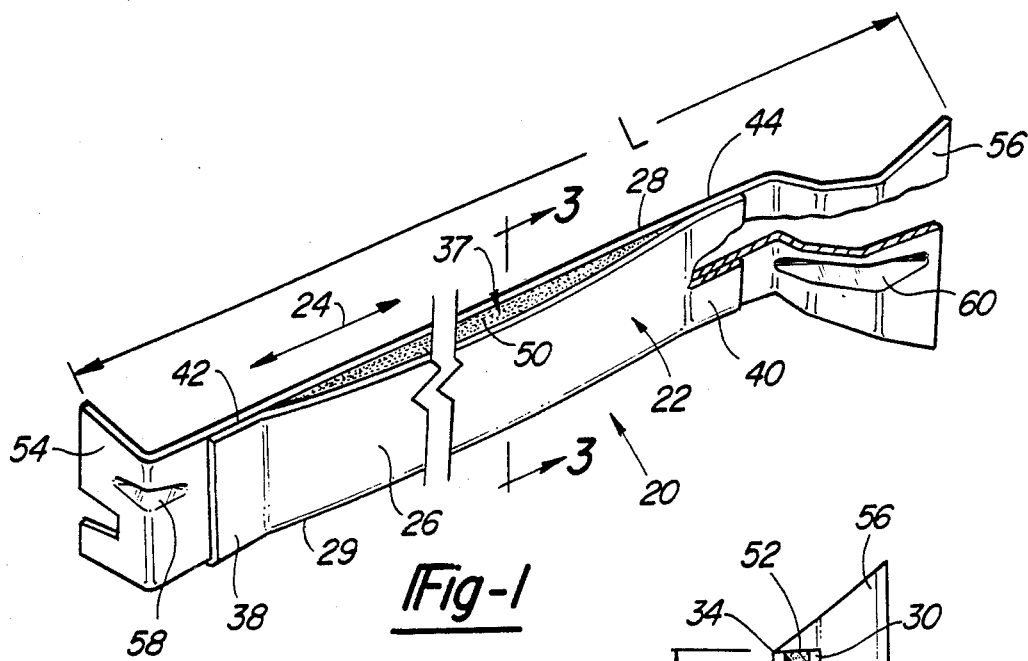
FIG. 1 is a perspective view of the door beam of the present invention in one preferred embodiment.

Referring now to the drawings in which like reference numerals designate like parts and, more specifically with reference to FIG. 1 of the drawings, door beam 20 is shown in the right-hand configuration generally having central section or body 22. Body 22 is in the nature of an open channel-shaped member or structure having a longitudinal axis represented by arrow 24. Body 22 is preferably an integral structure; that is, body 22 is preferably a unitary element, having a first wall or wall portion 26, second wall or wall portion 28, and a generally U-shaped portion 29 co-extensive with wall 26 and wall 28 in the direction of longitudinal axis 24. The relationship of walls 26, 28 and U-shaped portion 29 is shown in greater detail in FIG. 2 which is a cross-section along lines 3—3 of FIG. 1. In this particular embodiment of door beam 20, wall 26 is contoured or sculptured such that wall 26 curves outwardly, away from wall 28. It may be suitable in some applications to also curve wall 28 in the same or opposite direction as wall 26. This feature provides the ability to match the configuration of door beam 20 to the contour of the outer door panel or, for example, to conform to the plane through which a lowerable window passes inside a vehicle door. Thus, this contoured nature of door beam 20, which is a preferred embodiment of the present invention, is a feature which provides significant advantages which will be explained more below.

Figure 2:
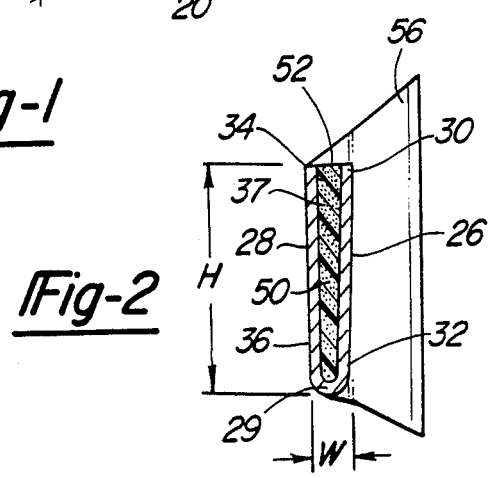
FIG. 2 is a cross-section of the door beam taken along lines 3—3 of FIG. 1.

It can be seen, and referring now to FIG. 2, that first wall or wall section 26 of body 22 has a portion 30 and a portion 32. Similarly, wall 28 has a portion 34 and a "edge" portion 36. Walls 26 and 28 are in opposed, spaced relation and are joined. Also, U-shaped portion 29 is integral with wall section 26 and wall section 28 at portions 32 and 36. U-shaped portion 29 is co-extensive with sides 26 and 28 substantially along the entire length of body 22 in the direction of or parallel to axis 24. While, as stated, walls 26 and 28 and U-shaped portion 29 are unitary or integral portions of door beam 20, it may be feasible to provide one or more of these elements as separate parts which are then connected by welding or the like to form the described structure.

One suitable metal for use in forming body 22 of door beam 20, and as will be further explained, for forming the mounting end pieces of beam 20, is steel. The gauge of the metal should be from about 0.040 to about 0.125, preferably from about 0.060 to about 0.100, and most preferably from about 0.070 to about 0.095. Preferred types of steel include HSLA 80, dual-phase 140, chrome molybdenum, and high carbon 1526 alloy. Other metals may be appropriate in some instances.

Referring again now to FIG. 1 of the drawings, the spaced relation of walls 26 and 28 and the geometry of U-shaped portion 29 define channel-shaped area 37 in the nature of a trough or groove. Thus, channel-shaped area 37 is bounded by walls 26 and 28 and by U-shaped portion 29. In this particular embodiment, channel-shaped area 37 is also bounded by the intersection of end portions 38 and 40 of wall 26 with, respectively, end portions 42 and 44 of wall section 28. End portion 38 is preferably bonded to end portion 42 by welding or by an adhesive bond. End portions 40 and 44 are similarly bonded to one another. Disposed within channel-shaped area 37 is seen core or filler member 50. To minimize the total weight of door beam 20, core 50 is formed of a synthetic resin-based material.

Core 50 substantially occupies channel-shaped area 37 in contact with walls 26 and 28 and U-shaped portion 29. The relative position of core 50 is best seen in FIG. 2 of the drawings. While core 50 is shown flush or in alignment with channel opening 52, core 50 could be recessed somewhat in channel-shaped area 37 or, alternatively, could extend out beyond lateral channel opening 52. Also, although core 50 is shown completely filling channel-shaped area 37, core 50 could be recessed somewhat from the intersection of end portions 38 and 42 and/or the intersection of end portions 40 and 44. Core 50 should, however, occupy the majority of channel-shaped area 37 to provide optimum increased bending strength of door beam 20. Core 50 is also preferably rigidly bonded to walls 26 and 28 and U-shaped portion 29 so that it does not separate from body 22 during deformation of door beam 20. The precise nature of this bond will be explained more fully hereinafter.

The composition of core 50 imparts excellent mechanical strength to door beam 20, particularly its bending strength and yet adds only marginally to the overall weight of beam 20. With specific reference now to the composition of core 50, the density of core 50 should be from about 15 pounds per cubic feet to about 40 pounds per cubic feet to minimize weight. An important feature of the present invention is the compressive strength exhibited by core 50 which should be at least about 1000 pounds per square inch and most preferably about 2000 pounds per square inch or greater. Also, core 50 should exhibit more than 10% elongation under dynamic impact. Core 50 should be bonded at least partially to the metal wall sections, and this bond should have a high peel strength. The preferred elongation and peel strength characteristics minimize separation of core 50 from metal body 22 and metal section collapse during gross deflection of door beam 20. Otherwise, separation of core 50 from body 22 would occur, causing premature catastrophic failure of beam 20.

For core 50, the melting point, heat distortion temperature and the temperature at which chemical breakdown occurs must also be sufficiently high such that core 50 substantially maintains its structure at high temperatures typically encountered in paint ovens and the like. Therefore, core 50 should be able to withstand temperatures in excess of 300 degrees F. and preferably 350 degrees F. for short times absent any significant applied stress. Also, core 50 should be able to withstand heats of about 180 degrees F. to 220 degrees F. for extended periods without exhibiting substantial heat induced distortion or degradation.

Core 50 is preferably formed by preparing a liquid or paste-like reinforcing material which is then injected or poured into channel-shaped area 37. The reinforcing material is hardened in place by curing or cooling to form core 50. Alternatively, core 50 may be preformed or precast by injection molding or the like and then inserted into channel-shaped area 37. In still another embodiment, channel-shaped area 37 is filled with pellets which are fully described in my copending U.S. patent application Nos. 837,624 and 811,041 (the disclosures of which are incorporated herein by reference), whereupon the pellets are then heated to partially melt a surface layer or region of the pellets such that the pellets bond together to form a matrix having interstices. This partial melting of the pellets also bonds them to the inner surfaces of walls 26, 28 and U-shaped portion 29.

In more detail, core 50 includes a synthetic resin, a cell-forming agent, and a filler. A synthetic resin comprises from about 70.0 percent to about 95.0 percent by weight, preferably from about 75.0 percent to about 94.0 percent by weight, and most preferably from about 78.0 percent to about 90.0 percent by weight of core 50. As used herein, the term "cell-forming agent" refers generally to agents which produce bubbles, pores, or cavities in core 50. That is, core 50 has a cellular structure, having numerous cells disposed throughout its mass. As will be seen, this cellular structure provides a low-density, high-strength material which, in combination with the channel-shaped structure of door beam 20, provides a strong, yet lightweight member. Cell-forming agents which are compatible with the present invention include reinforcing "hollow" microspheres or microbubbles which may be formed of either glass or plastic. Plastic microspheres may be either thermosetting or thermoplastic and either expanded or unexpanded. In one embodiment, unexpanded microspheres are used which are then expanded in place in channel-shaped area 37. The preferred microspheres are from about 1.0 to about 250 and preferably from about 10 to about 180 microns in diameter. Also, the cell-forming agent may comprise a blowing agent which may be either a chemical blowing agent or a physical blowing agent. Glass microspheres are particularly preferred. A cell-forming agent comprises from about 1.0 percent to about 10.0 percent by weight, preferably from about 1.0 percent to about 5.0 percent by weight, and most preferably from about 3.0 percent to about 5.0 percent by weight of core 50. Suitable fillers include glass or plastic microspheres, fumed silica, calcium carbonate, milled glass fiber, and chopped glass strand. Glass microspheres are particularly preferred. Other materials may be suitable. A filler comprises from about 4.0 percent to about 29.0 percent by weight, preferably from about 5.0 percent to about 24.0 percent by weight and most preferably from about 7.0 percent to about 19.0 percent by weight of core 50.

It is to be understood that these three components, synthetic resin, cell-forming agent and filler are present regardless whether core 50 is precast or formed in position in body 22. In one preferred embodiment, a liquid synthetic resin-based reinforcing material is prepared which is then poured into channel-shaped area 37 to form core 50. Of course, the end portions 38, 42 and 40, 44 must be welded or otherwise bonded to confine the liquid reinforcing material in channel-shaped area 37. Alternately, temporary or permanent bulkheads may be used to contain the liquid filler material. After the liquid reinforcing material is injected, poured or otherwise inserted into channel-shaped area 37, it is allowed to harden or solidify, preferably at ambient temperature. Of course, it may be desirable in some circumstances to artificially cool the liquid reinforcing material such that it solidifies at an accelerated rate.

Preferred synthetic resins for use in the present invention include thermosets such as epoxy resins, vinyl ester resins, thermoset polyester resins, and urethane resins. The average molecular weight of the resin component is from about 1000 to about 5,000,000 and preferably from about 10,000 to about 1,000,000, although molecular weights outside of these ranges may be suitable or desirable in some applications. It is not intended that the scope of the present invention be limited by molecular weight of the resin. Where the resin component of the liquid filler material is a thermoset resin, various accelerators, such as "EMI-24" (imidazole accelerator) and "DMP-30," and curing agents, preferably organic peroxides such as "MEK" peroxide and "Percadox," may also be included to enhance the cure rate. A functional amount of accelerator is typically from about 0.1 percent to about 4.0 percent of the resin weight with a corresponding reduction in one of the three components, resin, cell-forming agent or filler. Similarly, the amount of curing agent used is from about 1 percent to about 4 percent of the resin weight with a corresponding reduction in one of the three components, resin, cell-forming agent or filler. Where a thermosetting resin is used as the synthetic resin component, the liquid reinforcing material is preferably cured in place. This may be achieved by placing door beam 20 with the liquid reinforcing material in channel-shaped area 37 in an oven or the like, whereby the liquid-reinforcing material is heat-cured. Alternatively, the liquid reinforcing material is cured in place by exposing it to electromagnetic radiation, such as infrared rays, microwaves, or radiowaves in a manner which causes sufficient curing using the corresponding radiation-producing means. Of course, the form of electromagnetic radiation actually used must be compatible with the thermosetting resin. That is, if radiation cured, the thermosetting resin, and preferably any accelerator or curing agent, must be capable of being stimulated by the electromagnetic radiation to cure the resin. Effective amounts of processing aids, stabilizers, colorants, UV absorbers and the like may also be included in core 50. Thermoplastics may also be suitable.

It may also be suitable to cure the thermosetting resin by exposing it to a chemical vapor using chemical vapor-producing means, and again, the chemical vapor treatment must be of a nature such that it adequately cures the resin. It is to be understood that the liquid reinforcing material when cured or hardened in place forms a strong bond with the inner surfaces of walls 26, 28 and U-shaped portion 29 of beam 20. This is significant since, as stated, to provide good mechanical strength, core 50 should not separate from body 22 when door beam 20 deflects.

In those instances where core 50 is precast, it may be fully solidified or cured or, in the case of a thermosetting resin, it can be partially cured, such as to B-stage. If partially cured, the precast is placed in position in channel-shaped area 37 and then heated or otherwise cured to its full cure state. Also, core 50 can be precast using a thermosetting resin having a quantity of elastomer added thereto. In those embodiments where core 50 is precast and then inserted into body 22, it may be necessary to apply an adhesive to the precast core surfaces or to the internal or inner surfaces of walls 26, 28 and U-shaped portion 24 to form a good bond between core 50 and the surrounding metal which provides high peel strength characteristics. Suitable adhesives for this purpose include moisture cure urethane, elastomeric hot melt, toughened epoxy, and two-part urethane. The quantity of adhesive used per beam may vary, but is typically in the area of from about 2.0 to about 10.0 cubic inches. This adhesion of core 50 is also necessary to prevent rattling which might otherwise occur. Alternatively, or in addition to the application of a layer of adhesive between core 50 and the inner surfaces of walls 26, 28, and U-shaped portion 29, a cap or top layer of adhesive, preferably from about ⅛ inch to ¼ inch thick, may be applied at channel opening 52.

In the following tables, preferred formulations for core 50 are set forth. It is to be understood that these formulations may be used to form core 50 whether it is formed in position, as by the injection of a liquid reinforcing material or in the case of a precast core 50. It has been found that these formulations provide a core 50 which imparts unexpected superior strength to door beam 20.

| Formula I | | Formula II | |
|---|---|---|---|
| Ingredient | Percentage by Weight | Ingredient | Percentage by Weight |
| Polyester Resin ("AZS-137-69") | 89 | "Interez 504 Epoxy" | 59 |
| "Percadox 16N" | 2 | "Interez 855 Hardener" | 30 |
| "3M C15" | 9 | "3M C15" | 11 |
| Formula III | | Formula IV | |
| | Percentage | | Percentage |

| Ingredient | by Weight | Ingredient | by Weight |
|---|---|---|---|
| Polyester Resin ("AZS-137-69") | 89 | "Interez 510 Epoxy" | 25 |
| "Percadox 16N" | 2 | "Interez 507 Epoxy" | 25 |
| "3M C15" (⅛" to ¼" Thick Elastic Hot Melt or Epoxy Cap) | 9 | "Nadic Methyl" | 33 |
| | | "DMP 30" | 0.5 |
| | | "Poly BD Rubber" | 5 |
| | | "3M C15" | 11.5 |

It is to be understood that the reinforcing material from which core 50 is formed is such that core 50 reinforces body 22 so that body 22 resists collapse during the gross deflection of door beam 20. Without core 50, body 22 would buckle prematurely. If door beam 20 were allowed to buckle, it would lose its structural efficiency and load carrying capacity. It is preferred that the weight of core 50 not exceed about 4.5 pounds. It is preferred that the overall weight of door beam 20 be less than 12 pounds and most preferably less than 10 pounds for two-door vehicles. Core 50 provides from about 40 percent to about 100 percent or more increase in the load-carrying capacity of door beam 20. Also, since core 50 is preferably bonded to walls 26 and 28, walls 26 and 28 do not move apart from one another substantially during deflection of door beam 20.

Advantageously, the configuration of door beam 20 provides substantial intrusion resistance when door beam 20 is mounted in a vehicle door cavity, even though beam 20 is thin and lightweight relative to prior art door beams. Also, beam 20 can be readily adapted to fit within a variety of vehicle doors since its width, height and length, as designated in FIGS. 1 and 2 by the letters W, H and L, can be varied to meet designed demands while still maintaining excellent strength characteristics. For example, the length of door beam 20, which includes mounting means shown in FIG. 1 as integral end pieces or end tabs 54 and 56, is preferably about 3 to about 8 inches, which is compatible with most motor vehicle doors. The beam width is preferably from about 0.5 to about 1.25 inches and the beam height is preferably from about 3 to about 7 inches. In those instances where it is necessary to minimize the beam height, beam strength can be maintained simply by enlarging the beam width. Conversely, if a narrower door beam 20 is needed, the loss in strength produced by narrowing the beam can be compensated by increasing the beam height. Moreover, to increase bend strength, it is not necessary to change the type or thickness of metal, preferably steel, which is used to form door beam 20. This is achieved by simply increasing the beam height.

Referring again to FIG. 1 of the drawings, end pieces 54 and 56 are shown adapted to be mounted onto the inner door panel of a vehicle door. Thus, end pieces 54 and 56 must conform to suitable mating surfaces of an inner door panel to which beam 20 is mounted, preferably by spot welding beam 20 in position at end pieces 54 and 56. Five or more spot welds at each end piece 54, 56 are generally sufficient to form a rigid, reliable bond. Access depressions or beads 58 and 60 increase the door beam stiffness locally at the end pieces.

Figure 3:
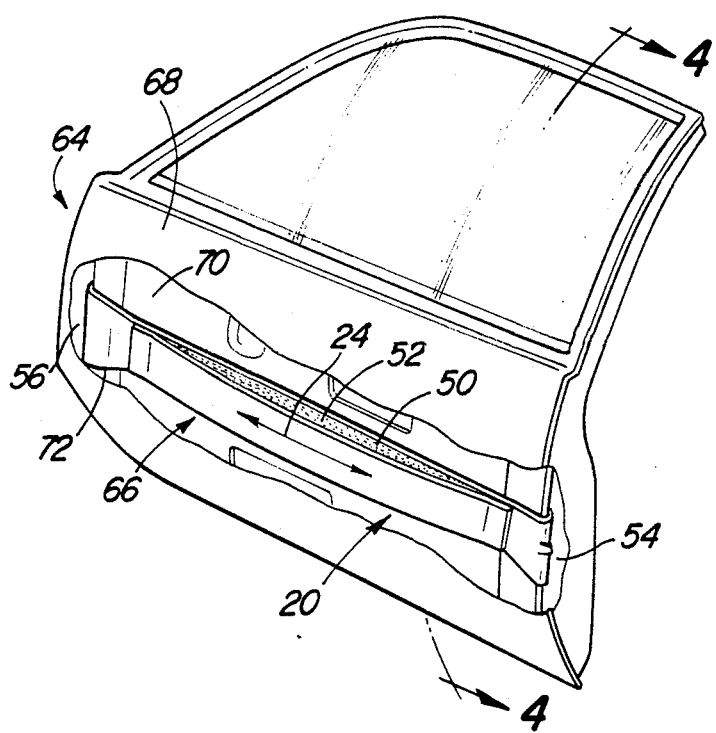
FIG. 3 is a reinforced vehicle door with the outer door panel broken away to expose the door beam of FIG. 1.

Note that wall section 28 is relatively straight or flat and that, as stated, in this embodiment, wall section 26 is configured such that its outer surface is curved along axis 24. That is, the geometry of wall 26 can be thought of as being bowed outwardly along axis 24. The significance of this feature is made apparent with reference now to FIG. 3 of the drawings, wherein vehicle door 64 is shown generally with door beam 20, shown here having a left-hand mounting configuration, mounted in position in door cavity 66. Beam 20 is mounted in vehicle door 64 in a substantially horizontal manner. That is, longitudinal axis 24 is substantially parallel with the bottom of vehicle door 64. Door 64 includes outer door panel or skin 68 and inner door panel 70. The attachment of end pieces 54 and 56 to inner door panel 70 is preferred as illustrated, although other mounting methods may be desirable in a particular application. It is also to be understood that various geometries of end pieces 54 and 56 and various arrangements of end pieces 54 and 56 in vehicle door cavity 66 are suitable and that only one possible preferred arrangement is shown and described. In the preferred arrangement, end pieces 54 and 56 are configured such that end piece 54 fits within a space provided between outer door panel 68 and the inner door panel 70. End piece 54 is then spot welded to inner door panel 70 with a sufficient number of welds to rigidly attach end piece 54 to inner door panel 70. End piece 56, having a preferred angle-shaped configuration, is similarly spot welded to inner door panel 70 at flange portion 72 of inner door panel 70.

Also, door beam 20 is preferably mounted in vehicle door 64 such that opening 52 of channel-shaped area 37 is nearest the top of door 64 and U-shaped portion 29 faces the bottom of door 64. Of course, the flat or spread area of each end piece 54, 56 must be large enough to accommodate the spot welds and must conform to the configuration of inner door panel 70 at the mounting regions. Also, by providing end beams 54, 56 integral with door beam 20, no additional stampings or brackets are required for mounting. One significant advantage in mounting door beam 20 to inner door panel 70 is that it allows automotive designers to use plastic or some other non-metal material to form outer door panel 68.

Figure 4:
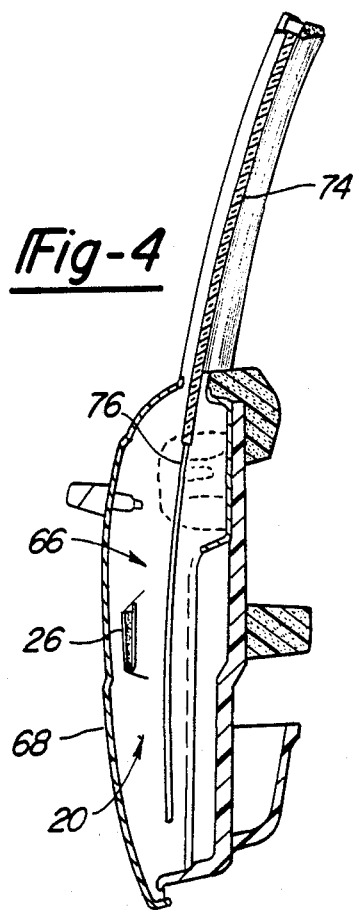
FIG. 4 is a cross-section of a reinforced door beam taken along lines 4—4 of FIG. 3.
Figure 5:
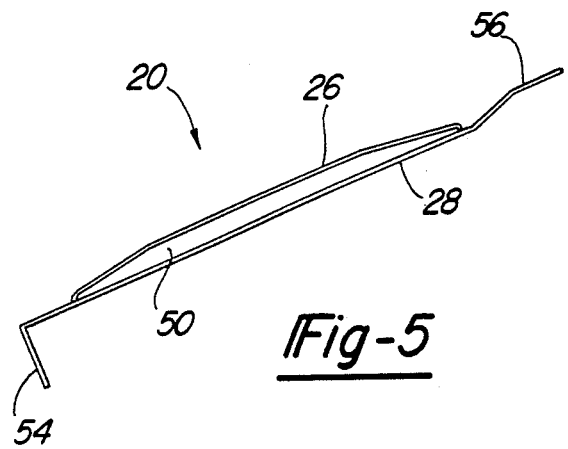
FIG. 5 is a diagrammatic plan view of one embodiment of the door beam of the present invention.

Furthermore, the unique configuration of the present invention facilitates the positioning of door beam 20 either "inboard" or "outboard" of the plane through which lowerable window 74 passes when it is retracted into door cavity 66. In FIG. 4 of the drawings, which is a cross-section along lines 4—4 of FIG. 3, door beam 20 has the general configuration shown in FIGS. 1—5 of the drawings and is mounted between the glass plane 76 and outer door panel 68. Again, the contoured nature of wall portion 26 "seats" or mates with outer door panel 68. That is, in most vehicles outer door panel 68 will be curved somewhat. The sculptured or contoured nature of outer wall portion 26 of door beam 20 matches the outer contour of door panel 68 so that wall section 26 is in substantial contact with outer door panel 68. This contour or curve of wall portion 26 is illustrated diagrammatically in FIG. 5, which is a plan view of the door beam.

Figure 6:
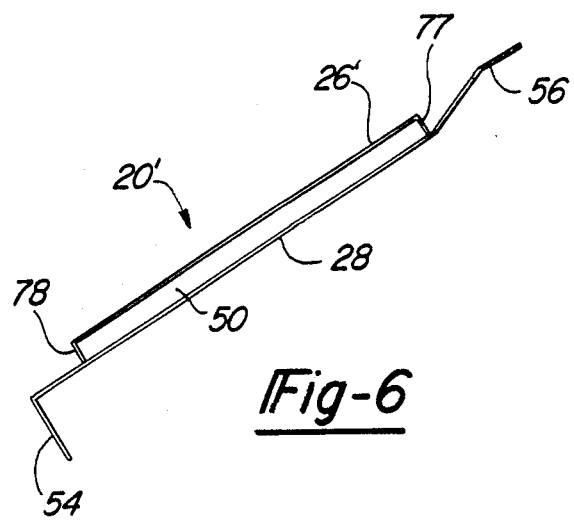
FIG. 6 is a diagrammatic plan view of another embodiment of the door beam of the present invention.
Figure 7:
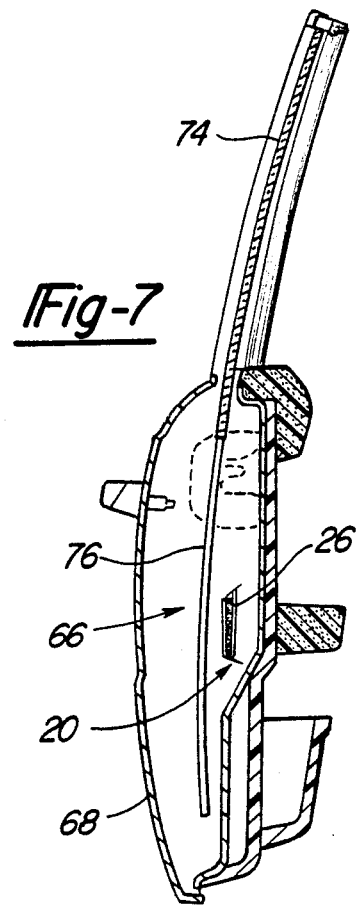
FIG. 7 is another reinforced vehicle door of the present invention in cross-section.

In another arrangement, door beam 20' is shown diagrammatically in FIG. 6, wherein wall portion 26' is not contoured. In this alternative embodiment, bulkheads 77 and 78 are provided, which are preferably integral flange portions of wall section 26'. Bulkheads 77 and 78 allow channel-shaped area 37 to be filled with liquid reinforcing material such that the liquid filler material does not escape before hardening or curing as previously described. Temporary bulkheads may be used for this purpose, which can be removed after core 50 has hardened sufficiently. Where core 50 is formed fully hardened, cured or partially-cured before it is inserted into channel-shaped area 37, no bulkheads, temporary or permanent, are necessary. Referring now to FIG. 7 of the drawings, door beam 20' has this alternate configuration mounted in door cavity 66 inboard of the lowerable glass plane 76. In other words, door beam 20' is mounted between inner door panel 70 and lowerable glass plane 76. This is a significant advantage of the present invention and allows for so-called flush glass vehicles doors to be fabricated using door beam 20'.

Thus, it has been shown that a novel door beam has been illustrated and described, and that the present invention also includes novel vehicles doors which are reinforced with the inventive beam. It is to be understood and is intended that the novel beam of the present invention can also be used to reinforce doors, other than motor vehicle doors, and can also be used to reinforce other structures such as walls or panels and the like.

Figure 8:
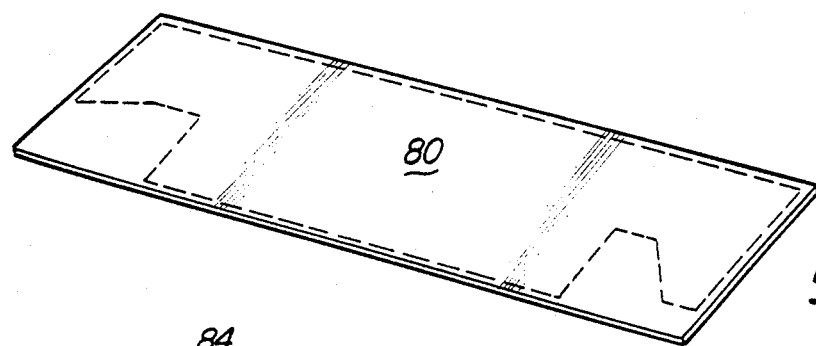
FIG. 8 is a perspective view of a metal blank having a dashed cutting line indicated thereon.
Figure 9:
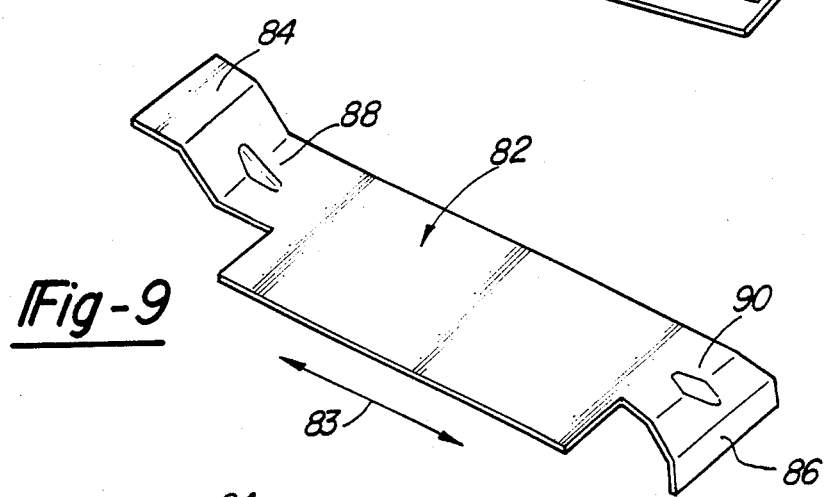
FIG. 9 is a perspective view of the door beam of the present invention in an intermediate stage of fabrication.
Figure 10:
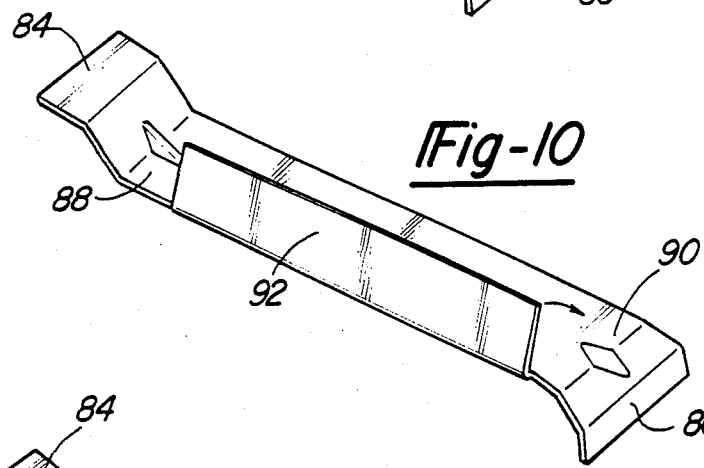
FIG. 10 is a perspective view of the door beam of the present invention in an intermediate stage of fabrication, illustrating the formation of the beam body.
Figure 11:
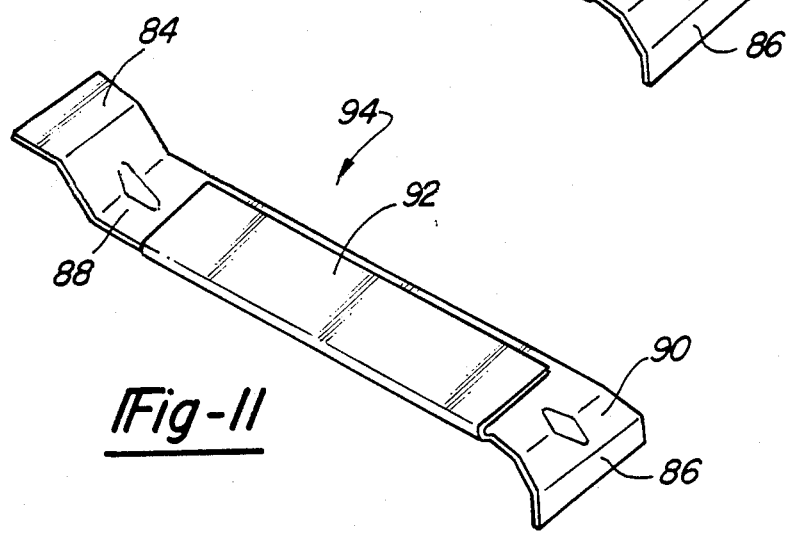
FIG. 11 is a perspective view of the door beam of the present invention in an intermediate stage of fabrication just prior to the formation of the beam core.

In still another aspect, the present invention provides a method of manufacturing the inventive door beam 20. Referring now to FIG. 8 of the drawings, metal blank 80 is shown which is a quantity of sheet metal. Portions of metal blank 80 are removed by cutting, stamping or the like along the dotted outline shown in FIG. 8 to form patterned metal piece 82 having a longitudinal axis 83, which is illustrated in FIG. 9. Preferably, end pieces 84 and 86 and stiffening beads 88 and 90 are formed in the same operation in which blank 80 is cut. Again, this is preferably done by stamping or the like. After patterned metal piece 82 has been formed, and referring now to FIG. 10, wall section 92 is folded or bent, preferably over a die (the die not being shown) to form beam 94 having a groove or trough illustrated in FIG. 11. As previously described, the ends of the trough are preferably closed by spotwelding or with bulkheads (not shown). The beam core (not shown) is then formed in place in beam 94 or is formed as a separate piece and then inserted into and bonded to beam 94 in one of the previously explained manners. This completes fabrication of the novel door beam of the present invention.

While a particular embodiment of this invention is shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

What is claimed is:
1. A lightweight composite beam adapted to be secured to a structure for providing structural reinforcement, said beam comprising:
   an open channel-shaped elongated metal member having a longitudinal cavity and a longitudinal axis, said longitudinal cavity extending substantially the entire length of said open channel-shaped member along said longitudinal axis;
   said channel-shaped member having a first wall and a second wall which forms said longitudinal cavity;
   one of said first and second walls being curved outwardly along said longitudinal axis;
   a core closely received in said longitudinal cavity of said open channel-shaped member, said core being formed of a synthetic resin-based material, said core being in rigid attachment with the walls of said open channel-shaped metal member and sub- stantially entirely filling said longitudinal cavity such that the bending strength of said open channel-shaped member is increased;

first and second mounting means attached to opposite ends of said open-channel-shaped member for securing both ends of said beam to said structure;

wherein said structure is strengthened by the presence of said beam.

2. The lightweight composite beam recited in claim 1, wherein said core includes from about 70 to about 95 percent by weight synthetic resin, from about 1 to about 10 percent by weight cell-forming agent, and from about 4.0 to about 29.0 percent by weight filler.

3. The lightweight composite beam recited in claim 2, wherein said first and second mounting means for securing includes metal end pieces and wherein said end pieces are integral with said channel-shaped member.

4. The lightweight composite beam recited in claim 1, wherein said synthetic resin-based material is selected from the group consisting of thermoplastic and thermosetting resins.

5. The lightweight composite beam recited in claim 1, wherein said core includes from about 1 to about 10 percent by weight hollow microspheres.

6. The lightweight composite beam recited in claim 1, wherein said core includes from about 1 to about 10 percent by weight of a blowing agent selected from the group consisting of chemical blowing agents and physical blowing agents.

7. The lightweight composite beam as recited in claim 1, wherein said filler is selected from the group consisting of glass microspheres, plastic microspheres, fumed silica, calcium carbonate, milled glass fiber and chopped glass strand.

* * * * *